Patented Jan. 10, 1939

2,143,383

UNITED STATES PATENT OFFICE 2,143,383

PROCESS FOR THE PREPARATION OF HYDROXY PROPANONE

Raymond W. McNamee, South Charleston, and Charles M. Blair, Charleston, W. Va., assignors to Carbide and Carbon Chemicals Corporation, a corporation of New York No Drawing. Application July 1, 1936, Serial No. 88,338

6 Claims. (Cl. 260—594)

This invention is a process for the preparation of hydroxy propanone ($CH_2OHCOCH_3$) from 1,2 propylene glycol. Broadly, the process comprises the dehydrogenation of 1,2 propylene glycol by the aid of a catalyst under appropriate conditions of temperature and pressure, wherein hydroxy propanone is formed and subsequently isolated. Hydroxy propanone, which is the simplest ketol, may also be called acetol or hydroxy acetone.

More specifically, the new process comprises passing vapors of 1,2 propylene glycol over a catalyst composed essentially of reduced copper together with a little chromium at a temperature of from about 230° to about 350° C. An inert gas diluent, such as nitrogen, may be used in conjunction with the propylene glycol vapor, although the use of diluents is not necessary. The issuing products, consisting of the hydroxy propanone together with unchanged propylene glycol and hydrogen, may be condensed (with the exception of hydrogen, which passes off as a gas), and refined by any convenient method to recover the pure product. The compound obtained by this process is a colorless liquid having a pleasant odor with a specific gravity of 1.0702 at 20°/20° C. and a boiling point of 146° C. at atmospheric pressure.

A satisfactory catalyst for use in the process may be one comprising reduced copper and chromium (the latter probably present as an oxide) supported on an inert carrer, such as porous silica filter stone. This preferred catalyst may be prepared by impregnating the inert carrier with salts of copper and chromium, for example, their nitrates, in the desired ratio, followed by roasting and reduction of the impregnated material. The chromium content may vary considerably, but need not exceed about 5%. The proportions of the metals in a preferred catalyst are about 96.5% copper and 3.5% chromium. Other dehydrogenating catalysts capable of performing a similar function to the copper and chromium catalysts may be used. For example, copper alone, or supported on an inert carrier, may be used, as well as cobalt, iron, platinum, nickel and palladium. It should be unstood the catalyst is not an essential part of this invention.

The following example will serve to illustrate further our process:

A continuous flow of propylene glycol vapor at the rate of 400 grams per hour was passed over 300 cc. of a catalyst comprising reduced copper and chromium supported on a porous silica carrier and at a temperature of about 285° C. The product was obtained at an efficiency of 95% with an overall yield of 46%. The production ratio was found to be about 590 grams of hydroxy propanone per liter of catalyst per hour.

This invention is by no means limited to the operation described and the process may be varied considerably. For example widely differing temperatures may be used depending principally upon the pressure and the particular catalyst selected. In general temperatures of from about 230° to about 350° C. at atmospheric pressure are suitable. The rate of flow may be varied, and, in general, increasing the rate of flow increases the rate of formation of the product. Other modifications which will not materially alter the process will be apparent, and such modifications are included within the scope of the invention as defined by the appended claims.

We claim:

1. Process of preparing hydroxy propanone which comprises dehydrogenating 1,2 propylene glycol by the aid of a metal dehydrogenating catalyst at a temperature of from about 230° to about 350° C.

2. Process of preparing hydroxy propanone which comprises dehydrogenating 1,2 propylene glycol vapor mixed with an inert diluent, by the aid of a metal dehydrogenating catalyst at a temperature from about 230° to about 350° C.

3. Process of preparing hydroxy propanone which comprises dehydrogenating 1,2 propylene glycol vapor by the aid of a reduced copper and chromium catalyst and at a temperature of from about 230° to about 350° C.

4. Process of preparing hydroxy propanone which comprises dehydrogenating 1,2 propylene glycol vapor mixed with an inert diluent, by the aid of a reduced copper and chromium catalyst and at a temperature of from about 230° to about 350° C.

5. Process of preparing hydroxy propanone which comprises dehydrogenating 1,2 propylene glycol vapor mixed with an inert diluent, by the aid of a reduced copper and chromium catalyst and at a temperature of about 285° C.

6. Process of preparing hydroxy propanone which comprises dehydrogenating 1,2 propylene glycol vapor by the aid of a reduced copper and chromium catalyst and at a temperature of about 285° C.

RAYMOND W. McNAMEE.
CHARLES M. BLAIR.